United States Patent
Barnes

[11] 3,837,362
[45] Sept. 24, 1974

[54] FLUID FLOW CONTROL
[75] Inventor: Gene A. Barnes, De Kalb, Ill.
[73] Assignee: Eaton Corporation, Cleveland, Ohio
[22] Filed: May 23, 1972
[21] Appl. No.: 256,149

[52] U.S. Cl. ............................................. 138/45
[51] Int. Cl. ........................................... F15d 1/02
[58] Field of Search .......... 138/45, 46, 40; 137/517, 137/541

[56] References Cited
UNITED STATES PATENTS

| | | | |
|---|---|---|---|
| 1,724,881 | 8/1929 | Lund | 138/46 |
| 2,154,223 | 4/1939 | Wade | 138/46 |
| 2,559,244 | 7/1951 | Erling | 138/45 |
| 2,772,691 | 12/1956 | Hoffman | 138/45 |
| 3,106,226 | 10/1963 | Machen | 138/45 |
| 3,165,097 | 1/1965 | Lowther | 138/45 |

Primary Examiner—William I. Price
Assistant Examiner—Steven M. Pollard
Attorney, Agent, or Firm—Hill, Gross, Simpson, Van Santen, Steadman, Chiara & Simpson

[57] ABSTRACT

An economical, accurate and efficient constant rate flow control operable at low pressure, high flow rates and high temperature comprises a tubular conduit fitting having a flow restrictor therein with a metering pin means movably mounted adjacent to the restrictor by means such as a coil spring so that movement of the pin means relative to the restrictor will vary the flow through the restrictor. As fluid flows past the pin means a pressure drop is created thereacross in proportion to the flow and the pin means is moved in response to the pressure drop whereby as the flow tends to vary, the pressure drop tends to vary proportionately and thereby maintain a relatively constant flow through the control. The restrictor is removable and by merely replacing it with one of another size the flow capacity may be varied.

1 Claim, 3 Drawing Figures

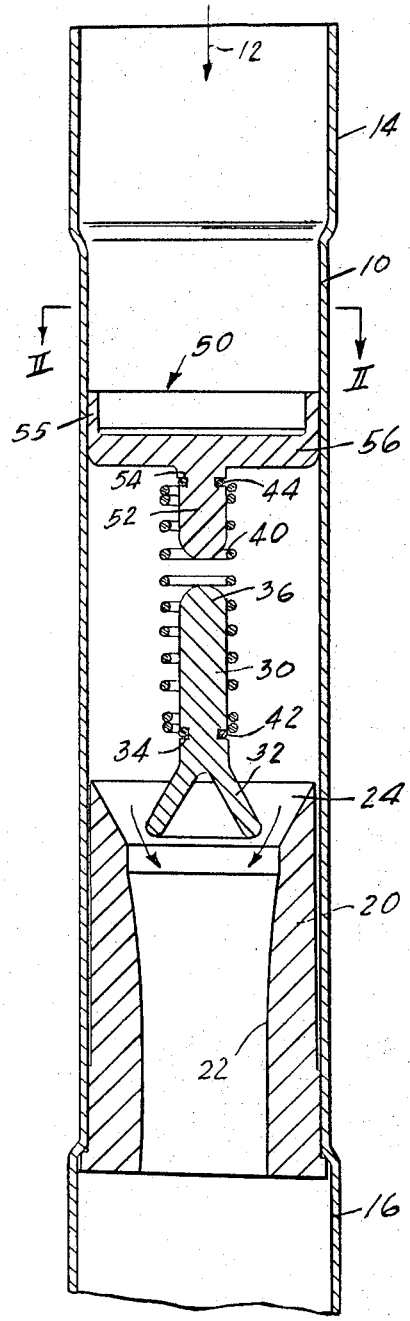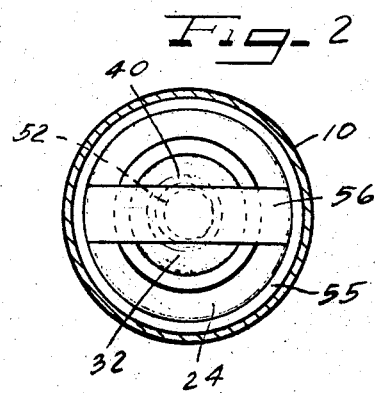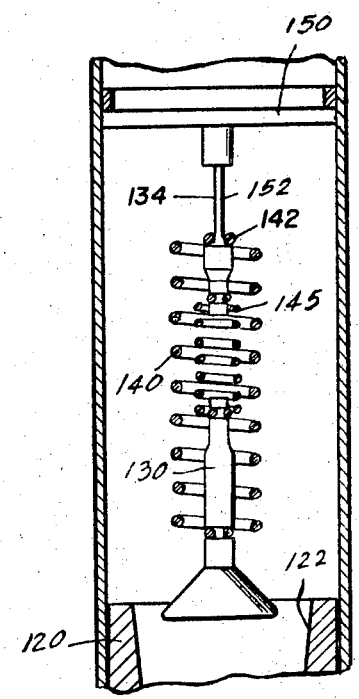

FLUID FLOW CONTROL

BACKGROUND OF THE INVENTION

This invention generally relates to a control means for fluid flow and more particularly concerns a fan coil type control wherein a relatively constant fluid flow is maintained through a venturi restrictor by a self-centering metering pin which is movable by variations in the fluid pressure drop thereacross to vary the flow restriction proportionately and thereby maintain constant flow through the control.

Control of fluid flow by means such as a venturi flow meter has been known for over a century yet despite this fact there has remained in the art of flow control a very real need for an economical, accurate, easily constructed and adaptable constant flow control operable under the conditions of low pressure, high flow rates and high temperatures. While there have been many attempts using many different approaches none has proven successful.

SUMMARY OF THE INVENTION

The longstanding and well known need for an efficient, economical constant flow meter has been met by the fluid flow control of my invention which comprises a tubular conduit fitting having a flow restrictor therein and a metering pin means movably mounted adjacent to the restrictor and movable by changes in fluid flow pressure to vary fluid flow proportionately whereby a relatively constant flow of fluid is maintained through the control. The metering pin means may be mounted in position by means of a resilient tension coil spring having one end attached to the pin means and the other end attached to a retainer means fixed in the tubular fitting. The pin means may have a generally conically shaped head portion pointed opposite to the direction of fluid flow whereby the pin means serves to center itself in the conduit fitting and in the fluid flow. Another portion of the pin means may be received within the coil spring and may frictionally bear against the coil spring whereby any tendancy of the spring to vibrate at its natural frequency will be reduced.

With the meter pin means thus mounted fluid flow past the head causes a drop in fluid pressure downstream of the head whereby the coil spring is tensioned. This tensioning force is directly proportional to the fluid flow. Accordingly, as the fluid flow increases, for example, the pressure difference increases and tends to move the metering pin closer to the restrictor inlet thereby tending to reduce the flow and counteract the increase so that a relatively constant flow will result. A similar situation occurs when the fluid flow decreases in which case the metering pin means tends to move away from the restrictor to allow greater amounts of fluid to flow which results in increased fluid flow and the movement of the pin means towards the restrictor to maintain the flow relatively constant.

The position in which the retainer is fixed in the fitting may be varied axially to move the pin means relative to the restrictor and allow calibration of the control. This ease of calibration has great advantages over using calibrated springs. Mounting of the pin means is simply and readily effected by providing a groove in the pin means and on the retainer attachment stub and snapping the tightly wound end coils of the spring into the respective grooves.

A contoured passageway in the flow restrictor meters the flow of fluid therethrough. It is an important advantage of this invention that the restrictor may be removably mounted in the fitting so that restrictors having various size passageways may be easily mounted in position. Each of the restrictors is designed so that only the restrictor and not the metering pin, etc., need be changed when a restrictor of a different flow rate is desired. This feature makes the flow control adaptable to a very wide range of usage. Thus, each restrictor will be designed to maintain a specific constant flow therethrough, e.g. 1 gpm, 6 gpm, etc.

Variations in flow due to the pin means being mounted in various positions are minimized according to my invention by keeping the metering pin means of a minimum weight.

In an alternative construction of my invention the metering pin means may be mounted with a main spring and a secondary spring means wherein the secondary spring means is of a low rate and force in proportion to the first spring such that very low pressures are required to extend it to the point where the main spring begins to act. As a result, when no fluid is flowing through the control, the second spring will draw the metering pin beyond the range of the first spring away from the restrictor to allow foreign objects to pass readily therethrough and not clog-up the control. In this case only a very small amount of fluid flow will overcome the relatively weak secondary spring and move the pin means to a point where the main spring will take over.

From the foregoing description of my invention it may be seen that I have invented an economical, accurate and efficient constant rate flow control operable in low pressure, high flow rates and high temperatures.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which:

FIG. 1 is a cross sectional view taken along a plane passing through the longitudinal centerline of an embodiment according to the invention;

FIG. 2 is a cross sectional view taken along the line II—II of FIG. 1; and,

FIG. 3 illustrates an alternative attachment between the pin means, spring and retainer.

DESCRIPTION OF THE PREFERRED EMBODIMENTS

A fluid control embodying the invention may be seen in FIG. 1 to comprise an elongated tubular fitting 10 having a flow restrictor 20 therein and a metering pin means 30 movably mounted adjacent to the restrictor 20 and movable by changes in the pressure of fluid flowing in the direction indicated by the arrow 12 to vary the amount of fluid which may pass through the restrictor 20 inversely to the fluid flow pressure whereby a relatively constant flow of fluid is maintained through the control means. The metering pin means 30 may be mounted in position as shown by means of a resilient tension coil spring 40 having one end 42 attached to the pin means 30 and the other end 44 attached to a portion 52 of a retainer means 50 which is fixed in position in the tubular fitting 10.

The restrictor 20 may be suitably mounted in the fitting 10 so that it is removable and thereby allows quick and convenient adaptability to a wide range of situations. A contoured path generally indicated at 22 meters the flow of fluid therethrough. Each of the restrictors 20 is designed to cooperate with the metering pin 30 to maintain a specific constant flow therethrough. For example, with the same metering pin 30 the flow through the control may be changed from 1 gallon per minute to 6 gallons per minute, for example, by removing the restrictor 20 designed to maintain the 1 gallon per minute flow and replacing it with a restrictor having a contour 22 designed to allow 6 gallons per minute therethrough. A computer study of the control operation has shown that desired levels of accuracy may be produced with standard manufacturing tolerances and standard calibration.

The restrictor 20 includes a seat 24 at its inlet end which seat extends from the vicinity of the inner diameter of the fitting 10 to a point adjacent the inlet end of the contour 22. The restrictor 20 operates on the well known venturi principle whereby as the velocity of flow of the fluid increases in the constricted part the pressure of the fluid decreases. Accordingly, the fluid flowing through the portion of the fitting 10 upstream of the restrictor 20 will be at a higher pressure then the fluid passing through the restrictor. This difference in pressure is known as a pressure drop. In my invention the metering pin 30 and particularly its head 32 is positioned in the area of the pressure drop and namely adjacent to the restrictor inlet. As shown, in FIG. 1, this occurs with the head 32 surrounded by the seat 24 of the restrictor 20. As shown, the head 32 may have a generally conical shape pointed opposite to the direction of flow as indicated by the arrow 12. With this design the pin means 30 serves to center itself in the flow and in the conduit fitting whereby it does not contact the inside of the fitting or the restrictor and hence eliminates possible noise and wear. Variations in flow due to the pin means being mounted in various positions along the axis are minimized by keeping the metering pin means 30 of a minimum weight and hence I have found it advantageous to use a lightweight material and to hollow out the conical shaped head 32 as shown.

Attachment of a first end 42 of the spring means 40 may be advantageously effected by providing a grooved portion 34 in the pin means 30 and tightening the end coil to a diameter smaller than the diameter of the pin means 30 so that the end coil will snap into position in the groove 34. A portion 36 of the pin means 30 upstream of the groove 34 advantageously is received within the coil spring 40 and is offset to one side of the spring as shown to cause a slight amount of friction between the pin means and the spring 40 whereby the friction damps out any tendancy of the spring 40 to assume its natural frequency of vibration.

The upstream end 44 of the spring 40 may be attached to an attachment projection 52 of the retainer means 50 by allowing the end coil 44 of reduced diameter to snap fit into a groove 54. The retainer 50 may be seen in FIG. 2 to include a ring-like structure 55 very tightly and securely engaging the inside of the fitting 10 to fix the position of the retainer means 50 with respect to the restrictor 20. A transverse bar type member 56 spans the ring-like portion 55 and may be integral therewith as well as with the spring retainer portion 52. The position on which the retainer 50 is fixed in the fitting 10 may be varied axially to move the pin means 30 along with the spring 40 and metering pin 30 relative to the restrictor 20 whereby quick and efficient calibration of the control is made possible. This ease of calibration provides great advantages in manufacture and maintenance.

The enlarged end portions 14, 15 of the tube 10 may be provided to allow attachment of the control to similar size conduits in a system.

With the structure thus set forth it will be seen that fluid flow in the direction of the arrow 12 will create a fluid pressure drop in the area of the head 32 and the restrictor 20 whereby the difference in pressure as well as the flow of the fluid will cause the pin means 30 to initially move downstream and tension the spring means 40. Because of the contoured profile of the restrictor 20 the pin 30 will assume a stable position under uniform flow conditions. As the flow and pressure of the fluid increases, for example, from this point the pressure drop increases in magnitude and thereby tends to move the metering pin 30 and particularly the head 32 further into the restrictor inlet which movement tends to reduce the effective area of flow through the restrictor and accordingly counteract the increase so that a relatively constant flow through the restrictor 20 will result. The movement of the metering pin means 30 is opposed by the spring 40. As may be seen, the contour 22 of the restrictor 20 and the spring flexibility and stretch are designed so that a constant flow will result through a wide range of pressure. Thus, for example, with controls designed for constant flow of 1 gallon per minute and 6 gallons per minute a pressure range of one through ten pounds per square inch will be readily accommodated. By calculating the contour profile and the spring rate with a computer, controls according to the invention have been tested and show good flow control of less than plus or minus 10 percent with no tendancy to make noise.

In the situation where the fluid flow decreases the pressure drop decreases thereby allowing the spring 40 to contract and move the metering pin 30 away from the restrictor inlet whereby a great amount of fluid is allowed to flow therepast which in turn increases the pressure drop and returns the pin means to a position where the pressure drop is balanced by the spring means 40 and hence the flow through the control is maintained relatively constant.

In an alternative "self cleaning" construction of my invention illustrated in FIG. 3, a metering pin means 130 is attached to an extension 152 of a retainer means 150 with an additional or secondary spring 145. In this case the secondary spring means 145 is of a low rate and force such that it exerts a relatively small force in proportion to the first or main spring means 140. When no fluid is flowing through the control the secondary spring 145 will tend to compress the first spring and withdraw the metering pin completely out of the bore 122 of the sleeve 120 so that any foreign matter would be allowed to pass through the much larger area. The extension 152 may have a widened groove 134 in which the constricted end 142 of the main spring means 140 is slidably received so that the main spring 140 may slide to allow the movement of the pin 130. Very low pressure is required to extend the secondary spring 145 to the point where the main spring begins to act so that at very low flow the pin will stroke forward towards the restrictor to the point where the main or first spring 140 will take over and operate as set forth as explained with regard to FIG. 1. As another means of improving the ability of the flow control to operate where foreign particles may be present in the fluid it is possible that a screen could be added at the retainer.

With the construction set forth the minimum number of parts and their standardized design make possible economical and easy construction of a flow control means. Moreover, the ease of calibration of the metering pin means by simply pressing the retainer 50 in the fitting 10 greatly simplifies manufacture and maintenance. The readily changeable restrictor 20 allows great adaptability of the invention to various uses. Accuracy of the flow control is assured by the interrelationship of the parts as well as the self-centering lightweight metering pin means. The durability and simplicity of the construction furthermore allows operability under conditions of low pressure, high flow rates, and high temperatures.

Although minor modifications might be suggested by those versed in the art, it should be understood that I wish to embody within the scope of the patent warranted hereon all such modifications as might reasonably and properly come within the scope of my contribution to the art.

I claim:

1. A fluid control for maintaining a constant flow, comprising:
    a tubular conduit fitting comprising a fluid inlet end and
    a restricted outlet end,
    a retainer means mounted within said tubular fitting and comprising an extension piece having a free end, said free end extending coaxially into said tubular fitting and having a seat formed thereon,
    a main coil spring extending within said tubular fitting and comprising restricted mounting and operating ends, said mounting end enclosing said tension piece of said retainer means and being held in place by the seat of said extension piece,
    a metering pin means having a mounting end and a free end and being received within said main coil spring, said mounting end being in the proximity of the operating end of said main coil spring,
    a flow restrictor means connected to said metering pin adjacent to the operating end of said main coil spring and extending freely into said tubular fitting,
    a secondary spring mounted on the seat of the extension piece of said retainer means and on the free end of said metering pin, extending within said main coil spring, and exerting a small force in proportion to that of said main coil spring,
    whereby, when no fluid is flowing through said control, said secondary spring will draw said metering pin means and said flow restrictor to a point beyond the range of said main spring means and away from the restricted outlet end of said tubular fitting, and
    whereby only a small fluid flow will cause said secondary spring to move said metering pin and restrictor means, to a point in the range of said first spring.

* * * * *